US005600805A

United States Patent [19]

Fredericks et al.

[11] Patent Number: 5,600,805
[45] Date of Patent: Feb. 4, 1997

[54] PASS-THROUGH FOR I/O CHANNEL SUBSYSTEM CALL INSTRUCTIONS FOR ACCESSING SHARED RESOURCES IN A COMPUTER SYSTEM HAVING A PLURALITY OF OPERATING SYSTEMS

[75] Inventors: Kenneth J. Fredericks; Robert E. Galbraith, both of Poughkeepsie; Richard R. Guyette, LaGrangeville; Marten J. Halma, Poughquag; Roger E. Hough, Highland; Suzanne M. John; James C. Mazurowski, both of Poughkeepsie; Kenneth J. Oakes, Wappingers Falls; Leslie W. Wyman, Poughkeepsie, all of N.Y.

[73] Assignee: International Business Machines Corporation, Armonk, N.Y.

[21] Appl. No.: 898,875

[22] Filed: Jun. 15, 1992

[51] Int. Cl.$^6$ .................................................. G06F 9/00
[52] U.S. Cl. ............................................................. 395/825
[58] Field of Search ................................... 395/275, 500, 395/375, 725

[56] References Cited

U.S. PATENT DOCUMENTS

| | | | |
|---|---|---|---|
| 4,253,195 | 2/1981 | Goldberg | 395/500 |
| 4,564,903 | 1/1986 | Guyette | 395/275 |
| 4,843,541 | 6/1989 | Bean et al. | 395/275 |
| 4,885,681 | 12/1989 | Umeno et al. | 395/375 |
| 4,967,342 | 10/1990 | Lent et al. | 395/275 |
| 5,170,472 | 12/1992 | Cwiakala et al. | 395/275 |

Primary Examiner—Robert B. Harrell
Attorney, Agent, or Firm—Bernard M. Goldman

[57] ABSTRACT

Enables any OS of plural OSs within any of plural logical-resource partitions (LPARs) of a CEC to use interpretive execution for synchronously-executable CHSC (channel subsystem call) commands. A CHSC command authorization mask (CCAM) is provided to control which CHSC commands are allowed to execute interpretively (with pass-through), and which commands are executed with hypervisor intervention (as all prior CHSC commands did). By enabling interpretive execution of those commands which can successfully operate with pass-through, significant system efficiency is obtained. And by disabling interpretive execution for a subset of CHSC commands (which are not allowed to execute with pass-through) potential system failures may be prevented. Thus, interpretive execution may be restricted differently among the OSs in a CEC. Novel CHSC command execution now handles multiple images of shared I/O resources by use of image identifiers, which could not be done before. The information requested by any OS issuing a CHSC command is filtered and optionally compacted by the I/O subsystem responding to the command by only providing information obtained from control blocks associated with the OS which issued the command. This is done by having a set of control blocks for each I/O resource, each control block in the set being associated with a particular OS.

20 Claims, 12 Drawing Sheets

FIG. 7

| | CHPID |
|---|---|
| IMPLIED IID | SUBCHANNEL NUMBER |

FIG. 8

| IMPLIED IID | FIRST QUEUE NO. |
|---|---|
| | LAST QUEUE NO. |

FIG. 9

| IMPLIED IID | FIRST SCH NUMBER |
|---|---|
| | LAST SCH NUMBER |

FIG. 10

| IMPLIED IID | SUBCHANNEL NUMBER |
|---|---|

FIG. 11

| VF | T | | DESC | CHPID |
|----|---|---|------|-------|

FIG. 12

| B | | R | | QUEUE COUNT |
|---|---|---|---|-------------|
| | | | | QUEUE NUMBER |
| SUMMATION OF QUEUE COUNTS ||||| 
| SUMMATION OF ENQUEUES ||||| 
| SWITCH BUSY COUNT 0 ||||| 
| CONTROL UNIT BUSY COUNT 0 ||||| 
| SUCCESS COUNT 0 ||||| 
| ⋮ ||||| 
| SWITCH BUSY COUNT 7 ||||| 
| CONTROL UNIT BUSY COUNT 7 ||||| 
| SUCCESS COUNT 7 |||||

| B | D | ST | | PM | DEVICE NUMBER ||
|---|---|---|---|---|---|---|
| LCUCB QUEUE NO. ||||| SCH NUMBER ||
| CHPID0 || CHPID1 || CHPID2 | CHPID3 ||
| CHPID4 || CHPID5 || CHPID6 | CHPID7 ||
| CU NUMBER 0 ||||| CU NUMBER 1 ||
| CU NUMBER 2 ||||| CU NUMBER 3 ||
| CU NUMBER 4 ||||| CU NUMBER 5 ||
| CU NUMBER 6 ||||| CU NUMBER 7 ||

FIG. 13

| B | D | ST | | DEVICE NUMBER ||
|---|---|---|---|---|---|
| PM || FLAVM | SCH NUMBER ||
| CHPID0 | CHPID1 | CHPID2 | CHPID3 ||
| CHPID4 | CHPID5 | CHPID6 | CHPID7 ||
| FLA0 |||| FLA1 ||
| FLA2 |||| FLA3 ||
| FLA4 |||| FLA5 ||
| FLA6 |||| FLA7 ||

FIG. 14

| MEANINGFUL INFORMATION |
| --- |
| MEANINGFUL INFORMATION |
| NOT MEANINGFUL INFORMATION |
| NOT MEANINGFUL INFORMATION |
| MEANINGFUL INFORMATION |
| NOT MEANINGFUL INFORMATION |
| NOT MEANINGFUL INFORMATION |
| ⋮ |
| MEANINGFUL INFORMATION |
| NOT MEANINGFUL INFORMATION |
| NOT MEANINGFUL INFORMATION |
| NOT MEANINGFUL INFORMATION |
| MEANINGFUL INFORMATION |
| MEANINGFUL INFORMATION |

FIG. 16

PASS-THROUGH FOR I/O CHANNEL SUBSYSTEM CALL INSTRUCTIONS FOR ACCESSING SHARED RESOURCES IN A COMPUTER SYSTEM HAVING A PLURALITY OF OPERATING SYSTEMS

INTRODUCTION

The invention provides a method for enabling an OS program to use interpretive execution for particular instructions to efficiently obtain filtered and compacted information about I/O resources shared by multiple control programs in a CEC, as described and claimed in patent application Ser. No. 07/898,867, now U.S. Pat. No. 5,414,851.

The entire content of the following USA patent applications, filed on the same day as the subject application, are incorporated by reference into this specification: application Ser. No. 07/898,867, entitled Method And Means For Sharing I/O Resources By A Plurality Of Operating Systems by F. W. Brice, Jr. et al; application Ser. No. 07/898,623, now U.S. Pat. No. 5,265,246, entitled Channel Measurement Method and Means, P. E. Galraith et al; application Ser. No. 07/898,977, entitled Asynchronous Command Support For Shared Channels For A Computer complex Having Multiple Operating Systems by M. P. Brown et al, now U.S. Pat. No. 5,452,455.

Also the following prior-filed applications assigned to the same assignee as the subject application have their entire content incorporated by reference into this specification: application Ser. No. 07/444,190, now abandoned, filed Nov. 28, 1989, by C. J. Bailey et al, entitled "Method And Apparatus For Dynamically Managing I/O Connectivity" (Docket Number KI989013); application Ser. No. 07/754,813, now U.S. Pat. No. 5,257,379, filed Sep. 4, 1991, by R. Cwiakala et al, entitled "Establishing Synchronization Of Hardware And Software I/O Configuration Definitions" (Docket Number PO991036); application Ser. No. 07/676,603, now U.S. Pat. No. 5,257,368, filed Mar. 28, 1991, by S. M. Benson et al, entitled "Method And Apparatus For Dynamic Changes To System I/O Configuration" (Docket Number PO990026); Application Ser. No. 07/755,246, now U.S. Pat. No. 5,253,344, filed Sep. 5, 1991, by J. E. Bostick et al, entitled "Method And Apparatus For Dynamically Changing The Configuration Of A Logically Partitioned Data Processing System" (Docket number PO991028); and application Ser. No. 07/693,997, filed Mar. 28, 1991, by R. Cwiakala et al, entitled "Dynamically Changing A System I/O Configuration Definition" (Docket Number PO991012), now U.S. Pat. No. 5,170,472.

BACKGROUND

Prior interpretive execution was obtained in a CEC having multiple independent OSs to increase the CEC's execution efficiency, which is highest when each OS in the CEC is able to have its CPU instructions executed interpretively. Having multiple independent OSs in a CEC requires that the CEC resources be apportioned among the OSs, and that the instructions executed under each OS be restricted to using only the CEC resources assigned to its OS—for example, to execute only within the memory range assigned to the respective OS in the main storage of the CEC.

The execution of multiple OSs in a CEC requires either software or hardware enforcement of resource restrictions and limitations provided for the respective OSs. Enforcement may require the intervention of a higher level operating system for the operating systems—this higher level operating system is called a hypervisor. A software hypervisor provides software enforcement of the OS resource restrictions, which intervenes to provide software limit checking for each instruction executed by any OS. This software hypervisor checking exacts a heavy system overhead burdon on the OS execution, since the OS execution must be interrupted for each instruction execution—this hypervisor interruption is herein called "interception". The software hypervisor interceptions greatly slow the instruction execution process compared to the execution of the same instructions in a similar CEC operating with only a single OS (native mode) which does not require limit checking.

Recent IBM CECs have provided hardware and/or microcode limit checking for instructions executing in multiple independent OS environments. This hardware/microcode limit checking has the advantage of eliminating the hypervisor interceptions as long as the execution stays within the prescribed restrictions and limits. The use of hardware/microcode checking to eliminate interception is herein called "Interpretive execution of an instruction". "Interpretive execution" can execute an instruction at nearly the same speed as execution in a similar CEC operating with only a single OS (native mode), which does not require checking.

With interpretive execution, hypervisor interception is only required if the instruction execution violates the prescribed limits and other restrictions, which should rarely occur.

A technique for obtaining interpretive execution was to use the S/370 "start interpretive execution" (SIE) instruction. Execution of the SIE instruction invokes hardware/microcode checking in a CEC.

Each SIE instruction locates an operand called a "state description" (SD), which is a control block in a CEC's main storage which defines a particular set of resource limits and restrictions. The SIE instruction execution is architected to check the execution of other instructions for violations of the resource restrictions and limits defined in the SIE instruction's SD. The instructions being checked are in a predefined set of IBM-architected CPU instructions.

This predefined set of architected CPU instructions for executing a program with the resource constraints in the SD of a particular SIE instruction is referred to as a "virtual CPU". Any OS may have one or more virtual CPUs running under it.

The resources defined in the SD for any virtual CPU are restricted to the resource boundaries defined for the OS under which that virtual CPU is to execute. Any number of virtual CPUs may execute under each of the multiple OSs in a CEC. The hypervisor predefines the content of any number of SDs to provide any number of virtual CPUs in a CEC. The hypervisor selects and executes one of its SIE instructions having a predefined SD to dispatch a virtual CPU for any OS.

The SIE instruction is executed by the hypervisor when it dispatches any OS to interpretively-execute instructions. The SIE instruction execution continues while the OS instructions are being interpretively executed.

In the prior art, the SIE instruction has been applied to I/O resources of a CEC, including in U.S. patent application Ser. No. 4,843,541 (PO9-87-002) and application Ser. No. 07/752,149 (PO9-91-035), now U.S. Pat. No. 5,222,215. Those inventions obtain interpretive execution for commonly-used CPU instructions, such as the "start subchannel" instruction.

Interpretive execution has been disclosed in the prior art, such as in the publication entitled IBM System/370

Extended Architecture Interpretive Execution (form number SA22-7095-1) which discloses the SIE instruction and its state description operand. The CPU and I/O architecture are dislosed in the IBM Enterprise Systems Architecture S/390 Principles of Operation (form number SA22-7201-00). Also, I/O architecture is disclosed in the IBM Enterprise Systems Architecture S/390 Common I/O Device Commands (form number SA22-7204-00). These describe the I/O architected structure used in the IBM S/390 systems, such as the IBM S/9000 Central Electronic Complexes (CECs). The I/O ESCON channel architecture is disclosed in the ESA/390 "ESCON I/O Interface" (form number SA22-7202-01).

A Channel Subsystem Call (CHSC) instruction has been used in prior IBM systems; it is an instruction with a single operand which addresses a "command request block" which contains an operation code field that is capable of representing a very large number of operation codes, each of which designates a special command function for the CHSC instruction. These I/O channel subsystem commands perform widely-varying types of I/O functions. Some of the prior CHSC instructions operated synchronously. Other prior CHSC instructions operated asynchronously. Asynchronous CHSC commands performing dynamic I/O reconfiguration functions are disclosed in previously cited U.S. Pat. No. 5,170,472 by R. Cwiakala et al which discloses and claims: a "change channel path configuration command", a "change control unit configuration command", and a "change I/O device configuration command". These asynchronous CHSC commands dynamically change the I/O configuration of a CEC while the CEC is normally operating.

Shared I/O resource concept uses the image identifier (IID) invention described and claimed in application Ser. No. 07/898,867 (PO9-92-016). The IID invention is generally independent of whether or not IIDs, themselves, are hidden from the operating systems (OSs) in the CEC. That application expresses a preference for the IIDs being hidden from the OSs to enable old versions of OSs to operate within a CEC modified with the IID invention to allow shared I/O resources among the OSs. Then, old OS versions may be run in a CEC also running new versions of OSs in its different partitions.

Multiple OSs in a CEC are coordinated by a hypervisor, in which the CPU and storage resources of the CEC are divided among the independently executing OSs. Some hypervisors are structured in internal code (e.g. microcoded hypervisor) and other hypervisors are structured in software (e.g. software hypervisor). A commercial example of a microcoded hypervisor is the IBM S/390 PR/SM (processor resource/system manager), which co-ordinates resource contentions among independently executing OSs in separate logical resource partitions (LPARs) of a CEC such as the IBM S/9000 model 900. An example of a commercial software hypervisor is the IBM S/370 VM/MPG (virtual machine/multiple preferred guests) system running on an S/370 3090 model J, in which so-called virtual machines (called preferred guests) execute separate OSs in respective logical resource partitions divided by the system software in a software directory. A preferred guest (sometimes called a V=R or V=F guest) operates with only one level of address translation, while a non-preferred guest (sometimes called a V=V guest) operates with two levels of address translation (which has signifantly higher system overhead than one level of translation).

In such prior multiple-OS systems, an I/O channel and its associated subchannels can only be directly used by a single OS without hypervisor intervention (pass-through operation). Hypervisor intervention requires an OS to interrupt its operation while the hypervisor accesses requested I/O channel or subchannel on behalf of the OS. This intervention uses the system inefficiently because it involves CPU execution of a large number of hypervisor instructions that are eliminated with pass-through operation, which eliminates the need for hypervisor intervention.

The one or more central processors (CPUs) in a CEC access a shared electronic storage (MS) in the CEC. The MS of a CEC is divided up among the CEC partitions containing the OSs, and each OS only uses its own part of MS to execute its programs and is not permitted to access any part of MS partitioned to any other OS.

The various resources used by the CPUs in a CEC are divided among the OSs by using a plurality of directories or state descriptors (SDs) in system memory. A "virtual CPU" is represented by each SD or by each section of a virtual machine (VM) directory. The OSs execute on the virtual CPUs within their respective logical-resource partitions of a CEC.

A hypervisor controls the overall operation of the CEC, including the dispatching of OSs on the central processors (CPUs) in the CEC, and the resolving of conflicts among the OSs.

A software hypervisor dispatches an OS by invoking software accessing the section of its directory associated with the virtual CPU being dispatched. Each VM directory section is associated with a particular OS through the subset of system resources it assigns to the virtual CPU.

A microcoded hypervisor dispatches an OS by executing the SIE instruction representing the virtual CPU in the OS being dispatched. Each SIE instruction is associated with a particular OS through the subset of system resources assigned to the virtual CPU in its SIE SD.

Each OS controls the dispatching of all supervisor and application programs which run under the respective OS without hypervisor involvement, unless an exception occurs.

Early hypervisor systems required the hypervisor to control all I/O operations for all OSs in the system (e.g. early VM/370 software) including having the hypervisor control all channel operations, start all subchannels for all I/O devices on a channel, and handle all I/O interruptions from its devices for all programs running under all OSs. Any OS running as a "guest" under the hypervisor had to be interrupted to allow the hypervisor to handle the I/O operations requested by the guest.

A hypervisor is used in U.S. Pat. No. 4,843,541 (PO9-87-002) entitled "Logical Resource Partitioning of a Data Processing System", assigned to the same assignee as the subject application, which describes and claims a system having "I/O passthru" to enable each OS in a CEC to handle its own I/O operations using dedicated I/O channels and devices without involving the hypervisor. This passthru (or passthrough) feature allowed each OS to start I/O operations requested by supervisor and application programs running under an OS, and allowed the OS to handle the I/O interruptions resulting from such I/O start operations. The hypervisor was only needed to intercept an OS channel operation when an exception condition occurred. That invention is used in the IBM PR/SM LPAR and S/370 VM MPG systems.

U.S. Pat. No. 5,222,215 Ser. No. 07/752,149 (PO9-91-035) filed on Aug. 29, 1991, entitled "CPU Expansive Gradation of I/O Interruption Subclass Recognition", assigned to the same assignee as the subject specification, enables a significant increase in the number of logical partitions (LPARs) and CPUs runnable in a CEC. This application enables each of the CPUs in a CEC (executing any OS running in the CEC) to handle all of the I/O interruption subclasses available in the system. This avoided a prior pass-thru constraint that restricted each OS to only handling interruptions for one of the I/O interruption subclasses available in the system.

A CEC hypervisor may or may not be assigned its own resource partition. A microcoded hypervisor may not need a partition, but a software hypervisor needs a partition to contain its software.

For security reasons, the system resources are specified differently for the hypervisor than for the OSs in the CEC. Only the hypervisor views each SIE instruction's operand which is a state description (SD) control block that defines system resources for a virtual CPU in the CEC. Each OS has other control blocks defining resources available to the OS. The I/O subsystem of a CEC is used by all OSs, although many of the I/O resources controlled by the I/O subsystem may be dedicated to only a single one of the multiple OSs in the CEC.

Prior S/390 CECs have I/O subsystem which contains one or more I/O processors (IOPs) and an I/O channel processor for each channel. The channel connects to one or more I/O control units, and the control units connect to I/O devices. Each IOP communicates with the CPUs and the channel processors in the CEC. Each channel processor is dedicated to controlling an associated channel, which use may transmit data in bit-serial or bit-parallel form, or with a combination of bit-serial and bit-parallel data transmission. (A currently bit-serial type of channel uses fiber optics with the IBM ESCON architecture.) The terms "channel" and "channel path" mean the same thing in this specification.

The asynchronously operating IOPs pass CPU requested I/O work to the channels, and may further include channel processors that receive the work requests from the IOPs to directly control the operation of the respective channels. Each channel processor may be dedicated to a particular OS, so that it can continuously sense the busy state of its channel.

A subchannel is specified for each I/O device supported by an OS under the IBM S/390 architecture. A SCHIB (subchannel information control block) is an OS control block used by an OS to specify resources usable by a subchannel, including the subset of channels usable by the subchannel. Each SCHIB contains fields for a up to eight channel identifiers, called channel path identifiers (CHPIDs), each of which specifies a channel which may be selected for use by the subchannel. An available one of the specified CHPIDs is selected for each data transmission request of the subchannel which is not busy at the time of a CPU subchannel request. Thus in prior CECs, only the channels assigned to the OS could be selected for any of its subchannels, since prior systems only assigned a channel to one OS which could not share channels.

Each prior I/O subsystem has a control block for each I/O resource which is only used by the CEC microcode, and the I/O subsystem control blocks cannot be accessed by either the hypervisor or OSs. However, special instructions are provided to enable predetermined I/O subsystem functions to be interfaced by both the hypervisor and the OSs when they execute on any CPU in the CEC.

A large number of subchannels are configurable in a CEC (up to 64K), but only a small number of channels are configurable in a CEC (up to 256) in the S/390 architecture.

Configuring a CEC's I/O subsystem involves more than merely considering physically-connected I/O resources, such as a CEC's physical-connected channels, physical-connected control units, and physically-connected devices. Control blocks are provided in the I/O subsystem microcode to electronically control these physical resources. Without these control blocks, the I/O resources alone would be useless to the CEC, because the physical entities alone of these I/O resources cannot be controlled to do work for the CEC.

Accordingly, merely connecting a physical resource to a CEC does not configure that resource into the CEC. This is because the existence of the resource cannot be recognized by the CEC hardware and software until the resource is represented by a control block, which is the entity looked to by the CEC hardware and software for controlling the physical resource.

In the prior art, a CEC's I/O configuration requires having one control block for each physically-connected I/O resource. The control block contains all of the information needed to control the corresponding I/O physical entity; for example, a busy bit in each control block is provided to indicate whether the physical entity is busy or not, as well as all kinds of other control fields for indicating the current physical characteristics of the entity.

In prior S/370 and S/390 architected computer systems, each channel was configured in the CEC by constructing a single channel control block (CHCB) in the CEC's I/O channel system storage. Each I/O device was configured in the CEC by constructing a single subchannel control block (SCB) in the CEC's I/O subsystem storage. One or more logical control units were configured in the CEC as a shared device cluster by constructing a single logical control unit control block (LCUCB). A shared device cluster is defined as a set of one or more logical control units that share devices.

The CHCBs, SCBs and LCUCBs are structured in the I/O subsystem storage, which is not accessible to the OSs, but is accessible to the CEC's hardware and internal code (microcode) to electronically control the corresponding I/O resources physically connected to the CEC.

A control block configured in the system may indicate several states for its physical I/O entity, such as if the entity is usable or not by an OS. For example, the physical resource may be subjected to a "vary off line" command which sets a field in its control block indicating the physical resource is not available for use. Or a "vary on line" command sets the control block field to indicate the physical resource is available for use, although it may be currently busy (indicated by the busy field) and therefore not currently selectable.

Prior art reconfiguration of the CEC's I/O subsystem involves changing these I/O subsystem control blocks. Reconfiguration may add a new control block into the I/O subsystem storage to bring a corresponding I/O resource into the CEC configuration, whether the physical resource was previously-connected or is newly-connected. Or, reconfiguration may delete an existing control block from the I/O subsystem storage to eliminate the corresponding I/O resource from the CEC configuration, even though the resource is still physically connected to the CEC.

Furthermore, two fundamentally different methods are provided in the prior art for obtaining reconfiguration of the CEC's I/O subsystem. They may be generically referred to as static and dynamic reconfiguration methods.

An adverse consequence was that when a dedicated channel or device was utilize only a small percentage of time by its assigned OS, the channel or subchannel could not be dynamically switched to another OS using passthru; only non-passthru hypervisor accessing was available with its resulting inefficiencies. Consequently, dedicated channels generally remained under-utilized. (The available manual switching of a channel to a different OS did not permit a dynamic online switching of an I/O channel to another OS.)

Limiting the number of channels to each OS had the effect of limiting the I/O data rate available to the OS by restricting the number of simultaneous parallel paths for data transmission.

A fundamental change in the control block structure of the I/O subsystem of the CECs is made by the invention in application Ser. No. 07/898,867 (PO9-92-016), which provides the concept of "sharing sets" of control blocks for enabling the sharing of I/O resources by plural operating systems (OSs) in a CEC, including I/O channels, and control units and devices using shared channels. The sharing set concept replicated the control blocks for the same resource and distinguished the control blocks in a sharing set by assigning them different image identifiers (IIDs). The different OSs occupy different logical partitions of the CEC. These partitions are considered logical partitions because they use different parts of the same CEC physical resources, or time share the same resources in the CEC; for example, the main storage is divided by microcode defined boundaries which can easily be changed without changing the physical structure of the main storage.

The operation of this invention is dependent on the use of the invention described and claimed in U.S. patent application Ser. No. 07/898,867 (PO9-92-016), which describes a novel I/O resource control method and means that enables an I/O resource (such as an I/O channel, subchannel (device) and logical control unit) to be dynamically shared (or operated unshared) by a plurality of operating systems (OSs) executing in a CEC.

Application Ser. No. 07/898,867 (PO9-92-016) describes a method for increasing the connectivity of I/O channels to a multiplicity of operating systems (OSs) running in different resource partitions of a central electronic complex (CEC) to obtain sharing of the channels among the OSs in a CEC. That application discloses the use of image identifiers (IIDs) for assigning I/O resources to different OSs. In the channel subsystem of a CEC, each shared I/O resource is provided a sharing set of control blocks (CBs) in which a respective CB is assigned to (and located by) a respective IID of one of the OSs running in the CEC. Each of the CBs in a sharing set provides a different image to each OS of the same I/O resource. The different CB images are independently set to different states by I/O operations with the resource for the different OSs, so that the OSs can independently operate the same I/O resource without regard to the order of use of the resource by the OSs. The IID used in executing an I/O request by an OS is transmitted to the I/O control unit used to access a requested I/O device and is stored by the control unit as part of the logical path connecting to the control unit for later use by the control unit in responding back to the requesting OS for the I/O request.

SUMMARY OF THE INVENTION

When the multiple image facility feature is put into a CEC, the instructions which require the feature (such as the I/O instructions and the CHSC instructions) can no longer execute properly, because their prior execution processes cannot handle sharable I/O resources.

It is an object of this invention to enable synchronously-executable CHSC (channel subsystem call) instructions to execute in a system having I/O resources shared by a plurality of OSs.

It is another object of this invention to enable synchronously-executable CHSC instructions to execute interpretively using pass-through facilities available to each of a plurality of OSs in different logical partitions of a CEC.

It is still another object of this invention to enable CPU instructions that initiate I/O operations with I/O resources shared by a plurality of OSs to execute interpretively in the CEC when these instructions do not require any interruption signal response from the I/O subsystem.

The invention also provides a method for an OS to obtain information about different aspects of the shared I/O resources described in patent application Ser. No. 07/898, 867 PO9-92-016.

The invention greatly increases the operational performance of a CEC by applying interpretive-execution to the processing of synchronous instructions.

A feature of this invention applies a filtering and data compaction technique to data accessed for a CPU instruction requesting data from I/O resources shared by a plurality of operating systems by providing only the data applicable to a requesting OS, and removing accessed data applicable to other OSs.

The subject invention provides performance improvements to the S/390 Channel-Subsystem-Call (CHSC) instruction's synchronous I/O commands for enabling them to operate with interpretive-execution, such as under the Start-Interpretive-Execution (SIE), hereafter called "CHSC Command Interpretations".

The subject invention provides extensions (enhancements) to the synchronous CHSC commands such that the OS is capable of obtaining information about different aspects of the shared I/O resources. The CHSC commands, store channel-subsystem characteristics, store channel-path description, store shared-device-cluster queues, store subchannel-control-unit data, store subchannel description, and store subchannel-path information, have been enhanced to provide a mechanism to obtain the state (characteristic) of the shareable-I/O-resource facility, the type of channel, the shared-device-cluster queues, the subchannel-control-unit blocks, the link-address information, and the status of paths for a particular subchannel image, respectively.

The subject invention provides a filtering data technique for a set of synchronous CHSC commands with a mechanism for determination of meaningful information and information compaction, hereafter called "CHSC Information Processing". The CHSC commands included in this set are store shared-device-cluster queues, store subchannel control-unit data, store subchannel description, and store subchannel-path information.

BRIEF DESCRIPTION OF THE DRAWINGS

FIG. 7 illustrates a CHSC command-request block for a "reset control-unit" command.

FIG. 8 illustrates a CHSC command-request block for a "store shared-device-cluster queues" command.

FIG. 9 illustrates a CHSC command-request block for "store subchannel control-unit data" and a "store subchannel description" command.

FIG. 10 illustrates a CHSC command-request block for a "store subchannel-path information" command.

FIG. 11 illustrates a channel-path-description block in a "CHSC command-response block for a store channel-path description" command.

FIG. 12 illustrates a shared-device-cluster queue measurement in a CHSC command-response block for a "store shared-device-cluster queues" command.

FIG. 13 illustrates a subchannel-control-unit block in a CHSC command-response block for a "store subchannel control-unit data" command.

FIG. 14 illustrates a subchannel-description block in a CHSC command-response block for a "store subchannel description" command.

FIG. 16 illustrates a command-response block when information compaction is not performed.

DETAILED DESCRIPTION OF THE EMBODIMENT

Figure 1:
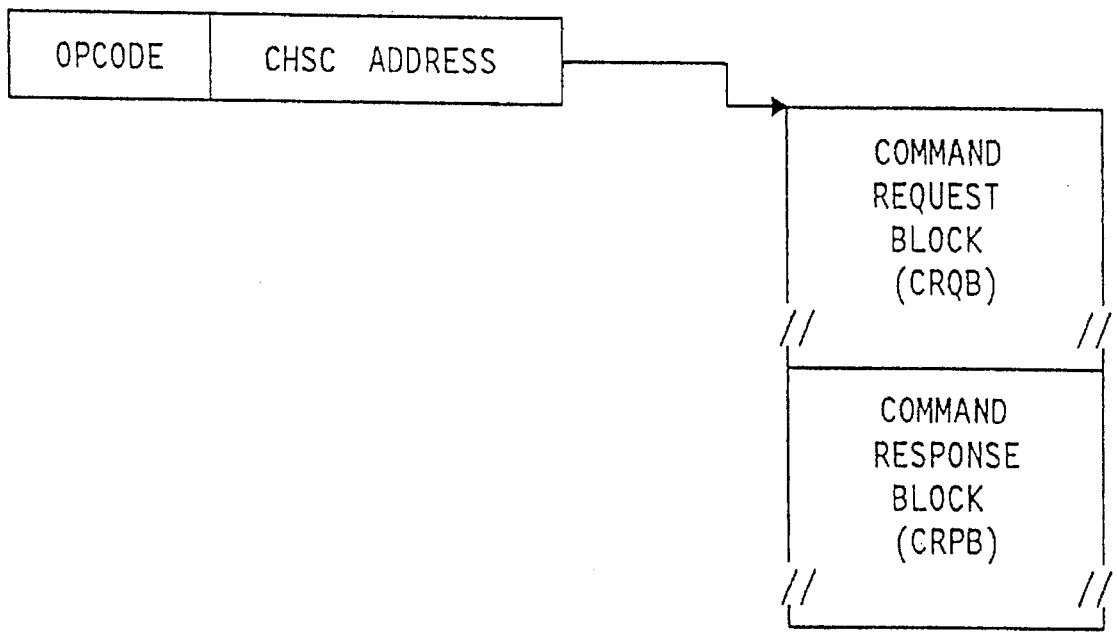
FIG. 1 illustrates the format of the CHSC instruction and the command request block (CRQB) and command response block (CRPB).

FIG. 1 shows the general form of the CHSC instruction, which has been used in prior IBM CECs. This instruction is used to invoke the new command processes described in this specification. The novelty in the described embodiments is in its new processes and command structures used by these processes.

The CHSC instruction has an operand containing an address of a command-request block (CRQB) that specifies the command to be executed by the instruction. A command response block (CRPB) is located contiguously with the CRQB in OS storage. The content of the CRPB is stored as a result of the attempt to execute the command in the CRQB.

Figure 2:
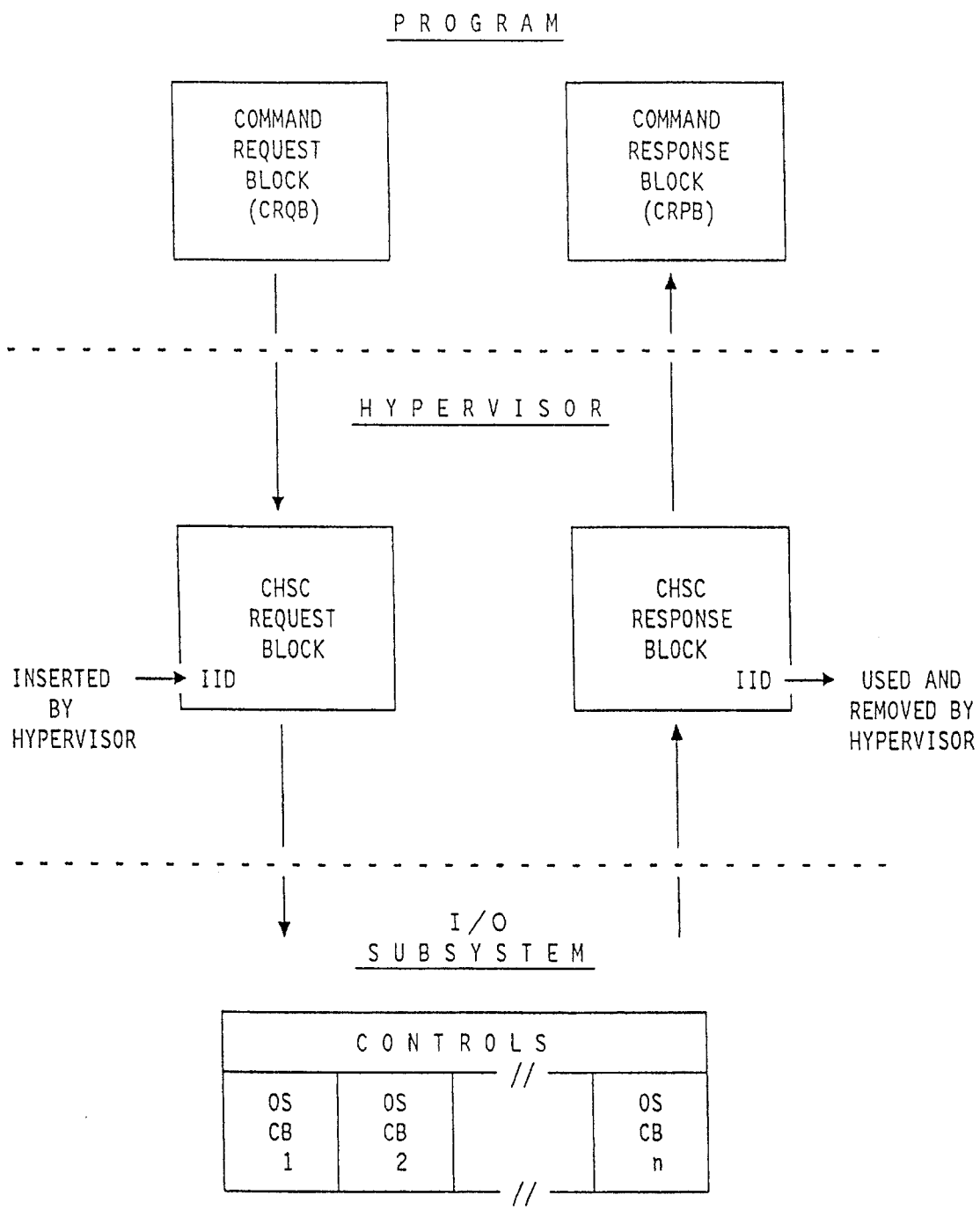
FIG. 2 illustrates operation of a CHSC command, novel to the subject invention, that involves a hypervisor or SIE insertion and removal of an image identifier (IID) to enable the I/O subsystem to associate the IID with the CRQB information and not allow the OSs to handle or view the IID values.

In FIG. 2, the contents of the command-request block are passed by microcode to the I/O subsystem. A hypervisor or SIE operation is done in passing the CRQB to the I/O subsystem that associates the image identifier (IID) of the OS issuing the CHSC instruction with the CRQB command information, which is sent to the I/O subsystem. This IID association with the CRQB is called an implied IID because the IID value is not stored into either the CRQB or the CRPB in the OS storage.

Then an attempt is made by the I/O subsystem to execute the command, which responds to the issuing OS with information that is stored by the I/O subsystem into a command-response block in the OS storage, without any IID value.

Figure 3:
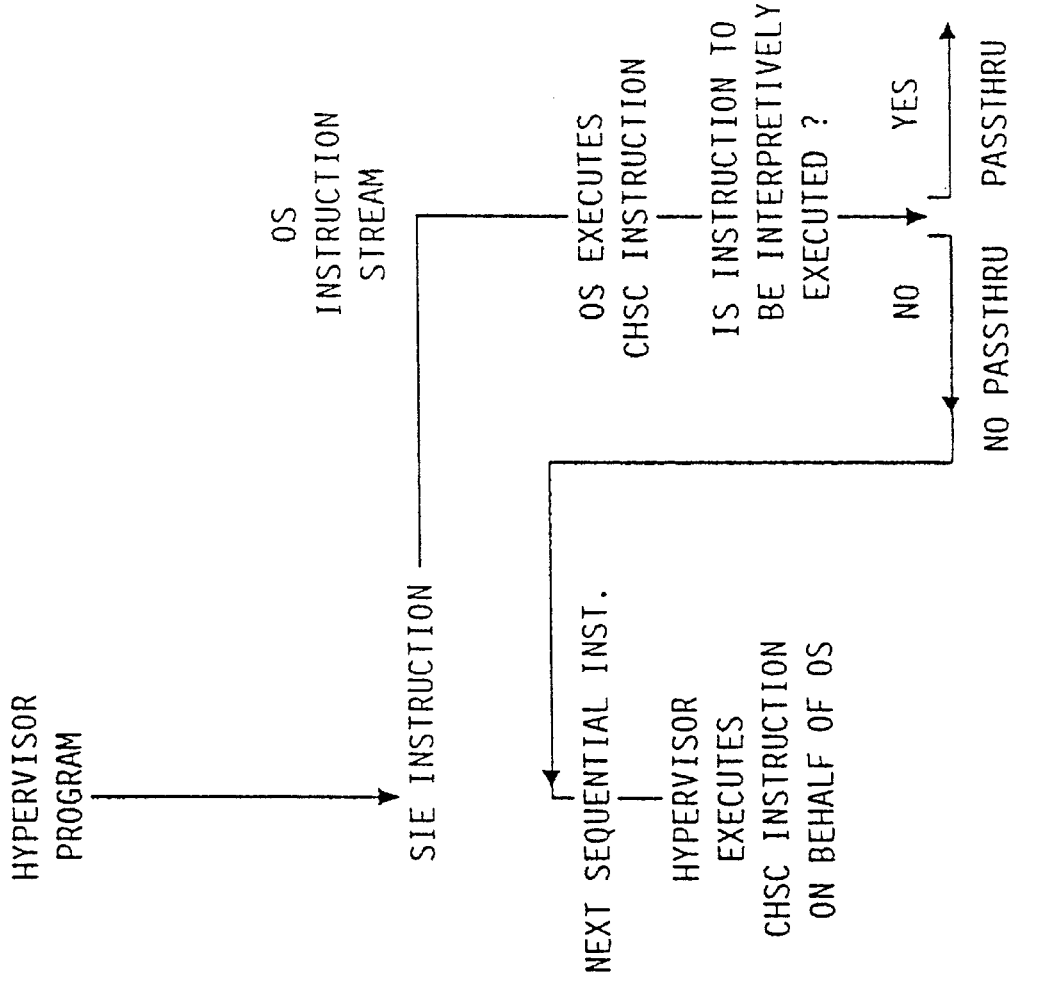
FIG. 3 illustrates a flow diagram of the execution path of a CHSC instruction in the preferred embodiment.

A process performed by each CHSC command is shown in FIG. 3, which determines if the command is to be either interpretively executed under the Start-Interpretive-Execution (SIE passthru) instruction, or executed by the hypervisor with a mandatory instruction interception (no SIE passthru). An OS (that is operating under control of the hypervisor) knows nothing of resource sharing or of the I/O subsystem handling shared resources, and an OS does not see any image identifier (IID) with which to select an image of a resource when issuing a CHSC instruction. Thus, the IIDs are transparent to the OSs.

Interpretive-Execution:

The need for control of interpretive execution of selected CHSC commands, hereafter called interpretive-execution definitions, is critical to using shared resources. The performance improvements of interpretive-execution together with the availability within each image for resources shared among OSs provides a significant advantage to the OS user.

For CHSC synchronous I/O commands, interpretive-execution definitions are completely new for handling shared resources. Some of the existing controls used for interpretive execution of I/O instructions are used for CHSC commands. However, the invention creates and uses a unique "CHSC Command-Authorization Mask (CCAM)" shown in FIG. 4. The CCAM is addressed from a field in a SIE SD (state descriptor). The CCAM contains a bit position for each synchronous CHSC instruction, for example a 512 bit field can contain a 512 bit mask, in which any bit position is set to a one state to represent a CHSC command which can be interpretively executed. A zero state for a bit represents that its CHSC command can not be interpretively executed, in which case hypervisor interception is required to execute the instruction.

Thus, the preferred embodiment of the CCAM comprises sixteen 4-byte words, or 512 bits of information. Each bit corresponds one-for-one, by relative position, with a value in the range of 0–511 as determined by bits 7–15 of the CHSC command code in a designated CHSC command-request block (CRQB). When a bit position in the CCAM (that corresponds to the value in bits 7–15 of the command code) contains a one, that CHSC command is authorized to be executed interpretively. Otherwise, interpretive execution is not authorized and a mandatory instruction interception occurs.

This preferred implementation of the CCAM provides for the authorization of up to 512 CHSC commands.

In another embodiment, the size of the CCAM could be extended to cover additional command codes or various bits of command code bits 0–7 can be wild card bit positions, so that multiple command codes may be authorized with a single bit in the CCAM.

Figure 5:
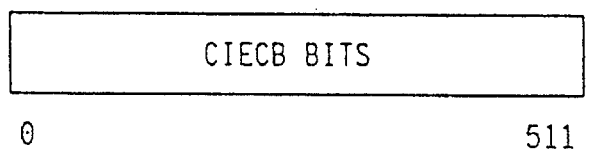
FIG. 5 illustrates the CHSC Interpretive Execution Control Block (CIECB).

Hence. the CCAM authorizes interpretive execution of a given CHSC command. The definition of each CHSC command ultimately determines whether the command can be executed interpretively. The definition of the command's semantics may not include provisions for interpretive execution of the command or no interpretive-execution definition may exist in the CEC as indicated by a bit being set to zero in the CHSC Interpretive-Execution Control Block (CIECB) as shown in FIG. 5.

Figure 6:
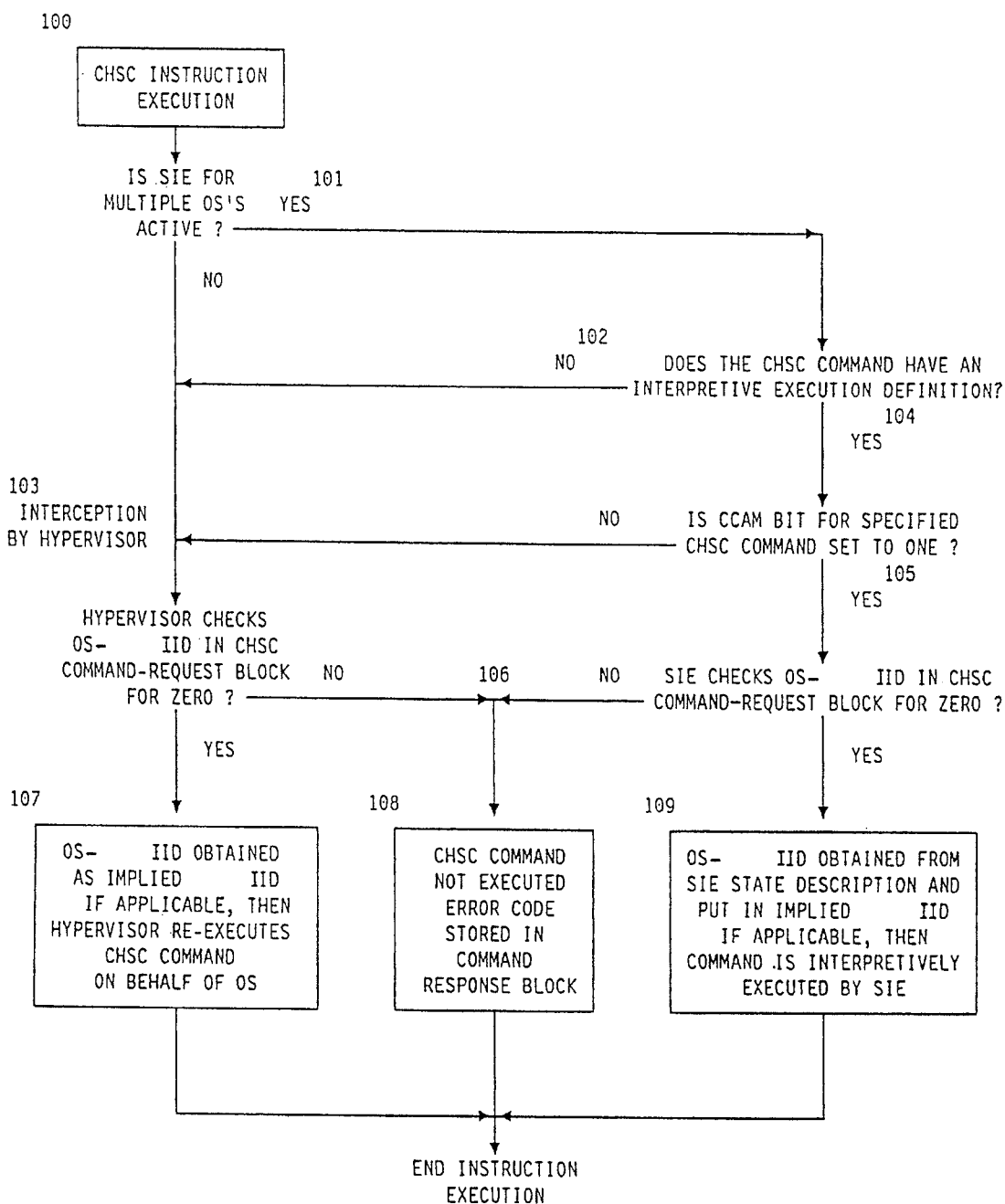
FIG. 6 illustrates a flow diagram of CHSC instruction execution with CHSC command interpretations.

Independent of the setting of the corresponding CCAM bit in the CHSC-interpretation block (CIB), when SIE is active (step 101 in FIG. 6) and no interpretive-execution definition exists (step 102 in FIG. 6) (that is, either the command's semantics preclude interpretive execution or the bit for the specific CHSC command in the CIECB is set to zero), the command is not interpretively executed and an instruction-interception condition is recognized (step 103 in FIG. 6).

When SIE is active (step 101 in FIG. 6), an interpretive-execution definition exists (step 104 in FIG. 6) (that is, the bit for the specific CHSC command in the CIECB is set to one), and the bit in the SIE CHSC command authorization mask (CCAM) that corresponds to the specific CHSC command code is set to one (step 105 in FIG. 6), the command is interpretively executed and operates as when SIE is not active, as shown in the rest of the flowchart in FIG. 6.

The identity of an image is made available for some CHSC commands by the insertion of the OS IID by the Start-Interpretive-Execution (SIE) or by the hypervisor. In the preferred implementation, the OS must be running in a CEC that is operating under control of a hypervisor in order for the OS IID to be recognized. The OS IID permits the OS program to execute an applicable CHSC command using the I/O subsystem resources and controls that are appropriate for the corresponding OS.

Figure 4:
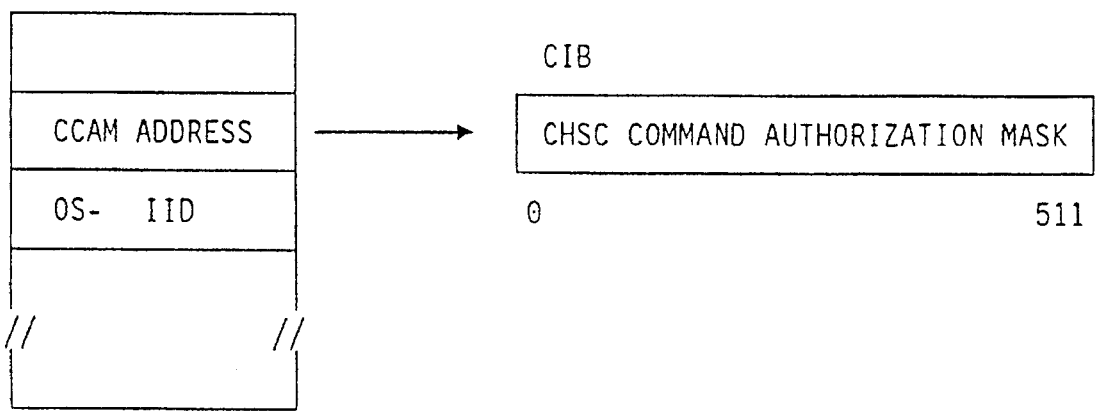
FIG. 4 illustrates the relationship of a SIE state description and a CHSC Command Authorization Mask (CCAM).

During interpretive execution of a CHSC command, the implied OS IID is provided on behalf of the OS by obtaining the IID from the active SIE state description shown in FIG. 4 and step 109 in FIG. 6. During a mandatory instruction interception for execution of a CHSC command, the implied IID is provided on behalf of the OS by the hypervisor as shown in FIG. 2 and step 107 in FIG. 6.

CHSC Synchronous Commands:

Prior to its execution, a CHSC command-request block is built by the OS in the OS's main storage for execution of an CHSC instruction. A command-request block (CRQB) indicates the specific command operation to be performed for the individual CHSC instruction. The initial part of the execution of a CHSC synchronous command is represented in FIG. 2. After successful processing of the CHSC instruction and the attempt to execute the specific CHSC command, results are returned to the OS in the command-response block. A novel image identifier (IID) concept is defined in previously cited application Ser. No. 07/898,867 (PO9-92-016). The OS does not specify an IID in the command-request-block field, but the IID is inserted by either the hypervisor or by SIE, when applicable. SIE or the hypervisor verifies that the OS has not supplied an IID by checking the IID field in the command-request block for zeros, and if not (step 106 in FIG. 6), stores an error response code and does not execute the command (step 108 in FIG. 6). As viewed by the OS that processes the CHSC instruction, the IID is implicitly specified, inserted in the command-request-block field for the OS running in the particular CEC that is under the control of a hypervisor, and the returned IID in the command-response-block field, if applicable, is used and removed by the hypervisor or SIE so that it is not visible to the OS, as shown in FIG. 2.

Some Processes Using An Implied IID:

As previously described: either the SIE instruction or the hypervisor inserts the IID, when applicable, and the IID has the following meanings:

For the CHSC reset-control-unit command, the IID, the channel-path ID, and the subchannel number in the appropriate command-request-block fields as shown in FIG. 7, collectively identify the channel image and logical control unit to be reset.

For the CHSC store channel-path description command, the IID and the channel path ID in the appropriate command-request-block field collectively identify the channel image for which the appropriate information is being obtained.

For the CHSC store shared-device-cluster queues command, the IID and the queue number in the appropriate command-request-block field as shown in FIG. 8, collectively identify the shared-device-cluster queue for which the appropriate information is being obtained.

For the CHSC store subchannel-control-unit data command, the store subchannel description command, and the store subchannel-path information command, the IID and the subchannel number in the the appropriate command-request-block field as shown in FIGS. 9 and 10, collectively identify the subchannel image for which the appropriate information is being obtained.

The CHSC synchronous commands that can obtain information about different aspects of shared I/O resources are store channel-path description, store shared-device-cluster queues, store subchannel-control-unit data, store subchannel description, and store subchannel-path information. The CHSC synchronous command that can obtain the state of the shareable-I/O-resource facility (multiple-image-facility characteristics of the I/O subsystem) is store channel-subsystem characteristics.

Store Channel-Path Description Command:

The store channel-path description command is enhanced to obtain and store the channel type (T) in the command-response block as shown in FIG. 11. The channel-type field is a binary value that indicates the channel is either shared or unshared.

Store Shared-Device-Cluster Queues Command:

The store shared-device-cluster queues command is enhanced to obtain and store in the command-response block, as shown in FIG. 12, the shared-device-cluster queues (measurements) for the OS running in the CEC that is under control of the hypervisor, which is configured to the specified image as indicated by the IID. Queues (measurements) for shared-device-clusters configured to other images, if any, is not provided.

When the CEC is operating under control of a hypervisor and no image in the configuration definition exists for the specified IID, the store shared-device-cluster queues command response indicates no shared-device-cluster queues present with a queue out-of-range indication (R field in FIG. 12) stored in the first shared-device-cluster queue block of the command-response block.

When the CEC is operating under control of a hypervisor and when measurement data is not associated with the specified IID or no shared-device-cluster queues exist, it is model dependent whether the CEC discards this meaningless information, or stores this meaningless information in the command-response block. Storing of information for the specified IID only is referred to as 'information compaction'. (See the "CHSC Information Processing" description later in this docket for additional information regarding when data is stored.)

When the CEC is operating under control of a hypervisor and the OS specifies the range of queue numbers (first queue number to last queue number) with a last queue number of all ones (FFFF hex) in the command-request block (FIG. 8), information compaction is the preferred implementation for storing shared-device-cluster queue blocks (measurements).

Store Subchannel Control-Unit Data Command:

The store subchannel control-unit data command is enhanced to obtain and store in the command-response block, as shown in FIG. 13, the subchannel-control-unit information for the OS running in the CEC that is under control of the hypervisor, which is configured to the specified image indicated by the IID. Information for subchannel images configured to other images, if any, is not provided.

The device-number-valid bit (D field in FIG. 13) is stored as zero when there is no device associated with the specified subchannel or when the hypervisor requires the bit to be set to zero.

When the CEC is operating under control of a hypervisor and no image in the configuration definition exists for the specified IID, the store subchannel control-unit command response indicates no subchannel-control-unit data present with a subchannel not-valid indication, that is, the subchannel-valid bit (B field in FIG. 13) and the device-number-valid bit (D field in FIG. 13) are stored as zeros, in the first subchannel-control-unit block of the command-response block.

When the CEC is operating under control of a hypervisor and because data is not associated with the specified IID or no subchannel-control-unit data exists, it is model dependent whether the CEC discards this meaningless information, which has the subchannel-valid bit set to one and the device-number-valid bit set to zero, or stores this meaningless information in the command-response block. Storing of information associated with the specified IID only is referred to as 'information compaction'. (See the "CHSC Information Processing" description later in this docket for additional information regarding when data is stored.)

When the CEC is operating under control of a hypervisor and the OS specifies the range of subchannel numbers (first subchannel number to last subchannel number) with a last subchannel number of all ones (FFFF hex) in the command-request block (FIG. 9), information compaction is the preferred implementation for storing subchannel-control-unit data.

Store Subchannel Description Data Command:

The store subchannel description data command is enhanced to obtain and store in the command-response block, as shown in FIG. 14, the link-address information for the OS running in the CEC that is under control of the hypervisor which is configured to the specified image indicated by the IID. Information for subchannel images configured to other images, if any, is not provided.

The device-number-valid bit (D field in FIG. 14) is stored as zero when there is no device associated with the specified subchannel or when the hypervisor requires the bit to be set to zero.

When the CEC is operating under control of a hypervisor and no image in the configuration definition exists for the specified IID, the store subchannel description command response indicates no subchannel-description data present with a subchannel not-valid indication, that is, the subchannel-valid bit (B field in FIG. 14) and the device-number-valid bit (D field in FIG. 14) are stored as zeros) in the first subchannel-description block of the command-response block.

When the CEC is operating under control of a hypervisor and because data is not associated with the specified IID or no subchannel-description data exists, it is model dependent whether the CEC discards this meaningless information, which has the subchannel-valid bit set to one and the device-number-valid bit set to zero, or stores this meaningless information in the command-response block. Storing of information associated with the specified IID only is referred to as 'information compaction'. (See the "CHSC Information Processing" description later in this docket for additional information regarding when data is stored.)

When the CEC is operating under control of a hypervisor and the OS specifies the range of subchannel numbers (first subchannel number to last subchannel number) with a last subchannel number of all ones (FFFF hex) in the command-request block (FIG. 9), information compaction is the preferred implementation for storing subchannel-description data.

Store Subchannel-Path Information Command:

The store subchannel-path information command is enhanced to obtain and store in the command-response block the current or last-known status of paths for a particular subchannel image.

Store Channel-Subsystem Characteristics Command:

The store channel-subsystem characteristics command is used to obtain and store in the command-response block the general characteristics of the I/O subsystem. This invention is enhanced by providing the characteristics of the shareable-I/O-resource facility, that is, the multiple-image-facility states. A bit indicates that the multiple-image facility is installed and that channels can be shared by hypervisors. Two mode bits indicate whether the CEC is operating under the control of a hardware hypervisor or a software hypervisor.

When the mode indicates that the CEC is operating under the control of a hardware hypervisor, 1) The hardware (logical-partition) hypervisor is operating and provides the multiple-image facility functions.

2) The hardware hypervisor is configured to a unique IID.

3) The IID is implicitly specified on behalf of the OSs operating in the logical resource partitions by the hardware hypervisor.

When the mode indicates that the CEC is operating under the control of a software hypervisor, 1) The derivative of the multiple-image facility that supports the software hypervisor is installed.

2) The software hypervisor is configured to a unique IID.

3) The IID is implicitly specified on behalf of the OSs operating in the logical resource partitions by the software hypervisor.

When the multiple-image facility is installed and the CEC is operating under the control of a hardware or a software hypervisor, the OS operating in a logical resource partition does not specify the IID and must specify zeros in all architecturally defined instances of the IID. This includes the following:

1) The IID in general register 1 of all subchannel related I/O-instructions,

2) The IID in general register 1 of the RCHP instruction.

3) The IID in the command-request block of various CHSC commands.

Store Event-Information Command:

The store event-information command is enhanced to provide the I/O subsystem the capability of supplying an IID to the hypervisor when the store event-information command presents "I/O-Resource-Accessibility Information". The hypervisor removes the implied IID before it stores the event information to OS main storage.

Figure 15:
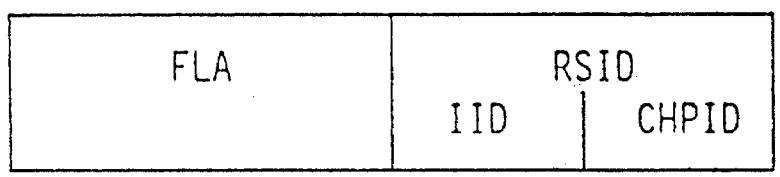
FIG. 15 illustrates a full-link-address (FLA) and resource-source IID fields in a CHSC command-response block for a "store event-information" command.

The implied IID and the channel-path ID (CHPID) in the reporting-source ID (RSID) field, and the full-link-address (FLA) field returned in the command-response block as shown in FIG. 15 are described as follows:

When the IID is supplied and the full link address (FLA) field has no meaning, one or more of the I/O devices that are attached to the specified channel image (determined by the specified CHPID and IID) may now be accessible.

When the IID is supplied and the full link address (FLA) field contains a link address, one or more of the I/O devices that are attached to the specified link (determined by the specified CHPID, IID, and link address) may now be accessible.

When the IID is supplied and the full link address (FLA) field contains a full link address, one or more of the I/O devices that are attached to the specified logical control-unit (determined by the specified CHPID, IID, and FLA) may now be accessible.

When the IID is supplied, the I/O resource-accessibility information is associated with a specific channel image. Other channel images that share the same channel, if any, are not implied by the information.

When the IID is not supplied, the I/O resource-accessibility information is associated with a channel only. All channel images that share the same channel, if any, are implied by the information.

CHSC Filtering Data Technique:

New with this invention is a filtering data technique, for a set of CHSC synchronous commands, called "CHSC Information Processing", which is only performed when the CEC is operating under control of a hypervisor.

The CHSC Information Processing defines the mechanisms (procedures and conditions) that determine whether information is meaningful and whether information compaction is performed for the store shared-device-cluster queues, the store subchannel control-unit data, the store subchannel description, and the store subchannel-path information commands as shown in FIG. 18.

Figure 18A:
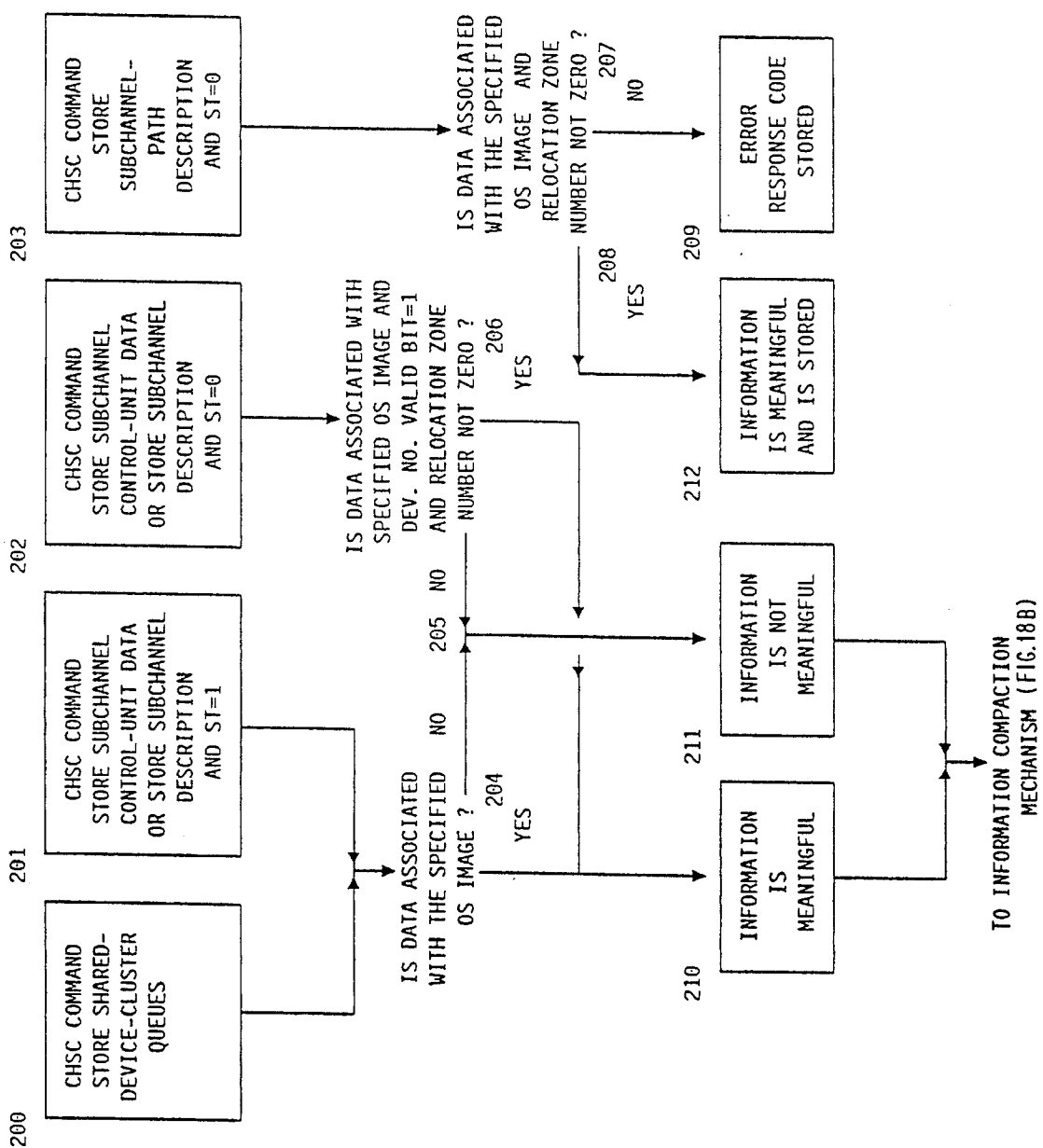
FIGS. 18A and 18B illustrate a flow diagram of a CHSC information process for determining meaningful information and for compacting the information.

Determination of Meaningful Information Mechanism: (FIG. 18A)

For the store shared-device-cluster queues command (step 200 in FIG. 18), the I/O subsystem considers the shared-device-cluster queue information to be meaningful when the shared-device-cluster queues are configured to the specified OS (step 204 in FIG. 18).

For the store subchannel control-unit data command or the store subchannel description command (step 201 or 202 in FIG. 18), the I/O subsystem considers the subchannel-control-unit information or the subchannel-description information, respectively, to be meaningful when all of the following conditions are met for each subchannel image in the specified range of subchannel images:

1) For a CHSC Subchannel Type (ST=1)

The IID specified in the command-request block is equal to the IID at the subchannel. (step 204 in FIG. 18)

2) For an I/O Subchannel Type (ST=0)

The IID specified in the command-request block is equal to the IID at the subchannel.

The device-number valid bit at the subchannel is one.

The relocation-zone number at the subchannel is not zero. (step 206 in FIG. 18)

For the store subchannel-path information command (step 203 in FIG. 18), the I/O subsystem considers the subchannel-path information to be meaningful when all of the following conditions are met for the specified subchannel image:

The subchannel is an I/O subchannel type (ST=0).

The IID specified in the command-request block is equal to the IID at the subchannel.

The relocation-zone number at the subchannel is not zero. (step 208 in FIG. 18)

When the appropriate conditions are met (step 204, 206, or 208 in FIG. 18), the requested shared-device-cluster queue information, the subchannel-control-unit information, the subchannel-description information, or the subchannel-path information is meaningful (step 210 or 12 in FIG. 18) and is stored (step 212, 305, or 306 in FIG. 18).

When one or more of the appropriate conditions are not met (step 205 in FIG. 18), the information is not meaningful (step 211 in FIG. 18) and information compaction may be performed for the specified shared-device-cluster queue or the specified subchannel image.

When one or more of the appropriate conditions are not met (step 207 in FIG. 18) for the store subchannel-path information command, an error response code is stored (step 209 in FIG. 18).

The relocation-zone number at the subchannel image must be set to zero for each subchannel image for which the hardware hypervisor does not want the I/O subsystem to store meaningful subchannel-control-unit information, meaningful subchannel-description information, or meaningful subchannel-path information, when the respective store subchannel control-unit data command, store subchannel-description command, or store subchannel-path information command is executed.

Figure 18B:
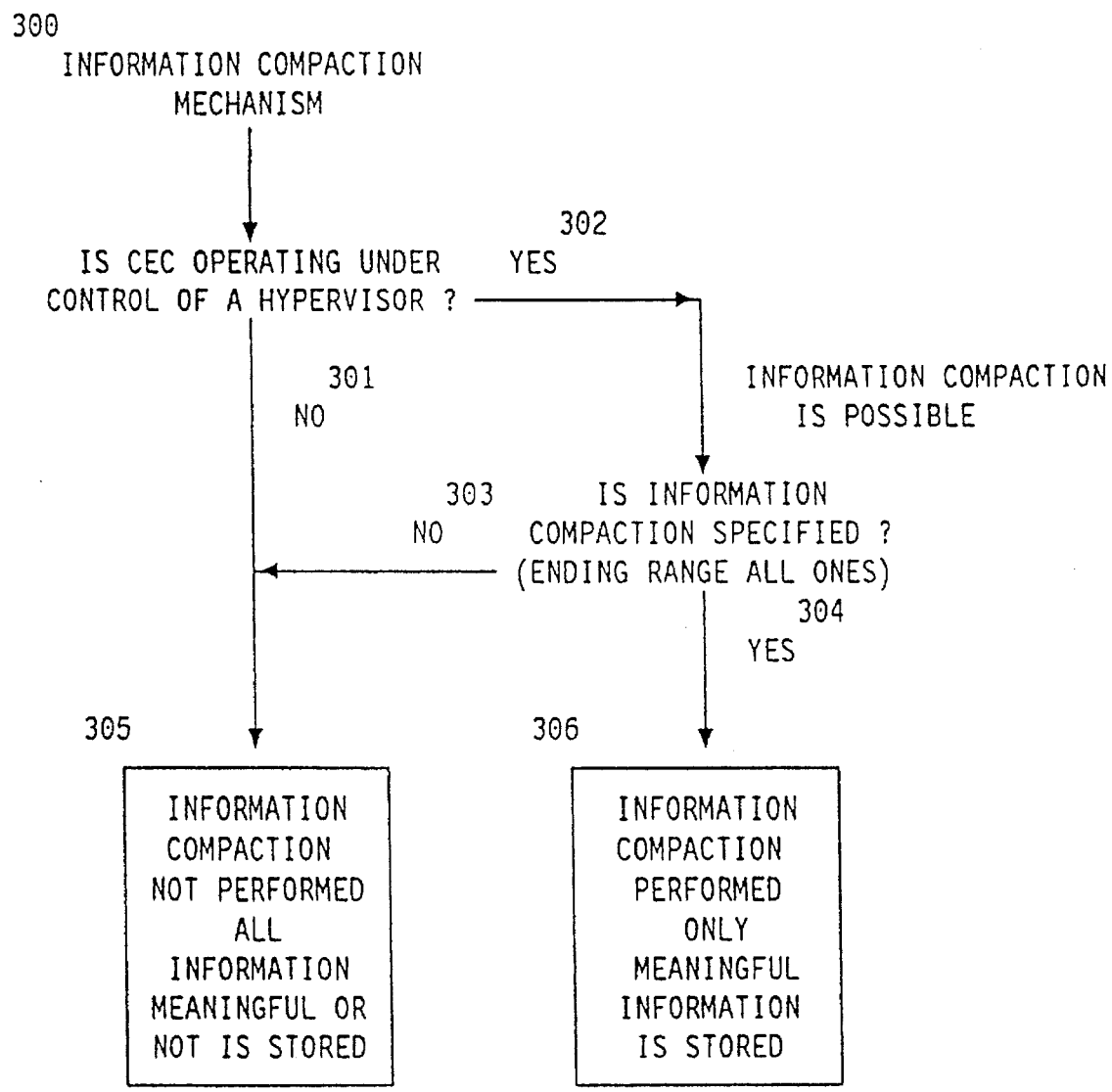

Information Compaction Mechanism: (FIG. 18B)

Information compaction is the process of storing only meaningful information in the appropriate command-response-block entries for the store shared-device-cluster queues, the store subchannel control-unit-data, and the store subchannel-description commands (step 306 in FIG. 18).

When the CEC is not operating under control of a hypervisor (step 301 in FIG. 18), information compaction is not performed (step 305 in FIG. 18), that is, all shared-device-cluster-queue information, subchannel-control-unit information, or subchannel-description information, whether meaningful or not, is stored.

When the CEC is operating under control of a hypervisor (step 302 in FIG. 18), information compaction is performed (#306 in FIG. 18), that is, only meaningful information is stored, if the program specifies:

1) The range of queue numbers with an ending range that indicates a queue number of all ones (FFFF hex) for the store shared-device-cluster queues command (step 304 in FIG. 18).

2) The range of subchannel images with an ending range that indicates a subchannel number of all ones (FFFF hex) for the store subchannel control-unit-data command or the store subchannel description command (#304 in FIG. 18). Otherwise (step 303 in FIG. 18), information compaction is not performed (step 305 in FIG. 18).

Figure 17:
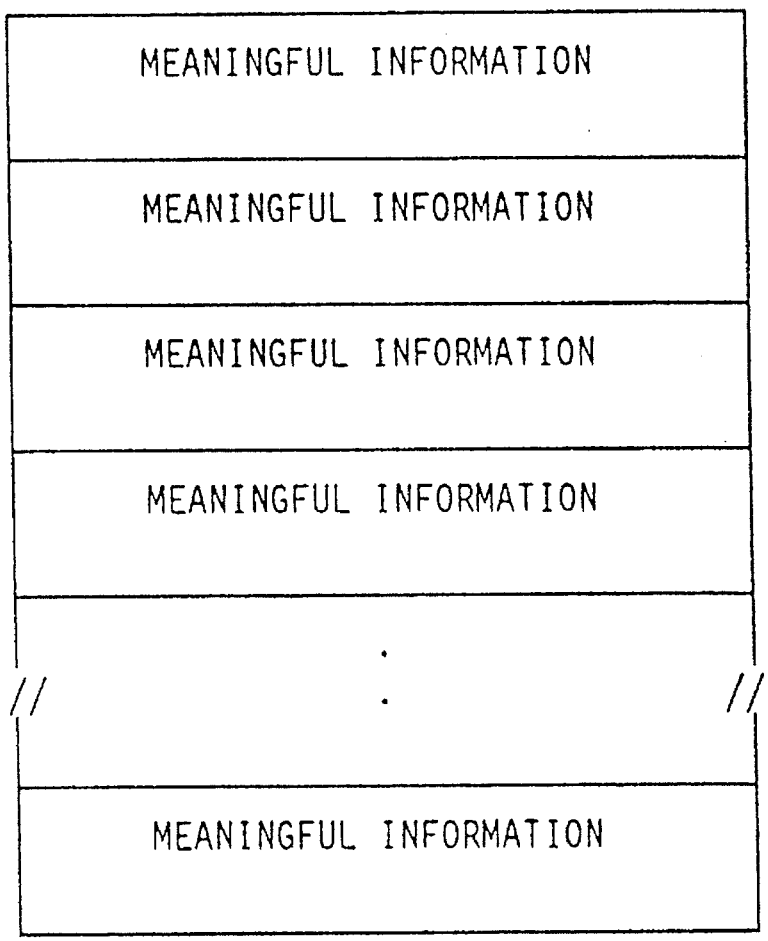
FIG. 17 illustrates a command-response block when information compaction is performed.

FIGS. 16 and 17 show examples of command-response blocks for when information compaction is not performed and for when information compaction is performed, respectively.

When information compaction is not performed for the store shared-device-cluster queues command, the shared-device-cluster-queue block may contain entries with no meaningful information, except for the queue-number field and the queue-out-of range (R) bit in FIG. 12.

When information compaction is not performed for the store subchannel control-unit data command or the store subchannel-description command, the subchannel-control-unit block or the subchannel-description block, respectively, may contain entries with the subchannel-valid (B) bit stored as one, the device-number-valid (D) bit stored as zero, and no additional meaningful information, except for the subchannel-number (SCH NUMBER) field and the subchannel-type (ST) field in FIGS. 13 and 14.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. A method of controlling system hardware operations for a plurality of I/O subsystem call instructions issued by any of a plurality of operating systems (OSs), including control programs, executing on a computer electronic complex (CEC) in which the plurality of OSs operate in different logical partitions of resources of the CEC, comprising the steps of:

executing instructions on a central processor (CPU) of the CEC for any of the OSs, including different types of I/O subsystem call (CHSC) instructions for communicating different types of requests by OSs to the I/O subsystem for requesting different types of I/O subsystem data and operations, including a request for I/O configuration data;

sharing by the OSs of I/O resources of the I/O subsystem;

storing a pass-thru CHSC control mask (CCAM) in system storage having fields associated with different types of CHSC instructions;

accessing the CCAM during CPU execution of any type of CHSC instruction, and accessing a field in the CCAM associated with a type of CHSC instruction being currently executed by the CPU to indicate whether the CPU is to execute the CHSC instruction in a pass-thru mode or not; and if in pass-thru mode, signalling by the CPU to the I/O subsystem to continue execution of the CHSC instruction by obtaining I/O data and performing operations indicated for the CHSC instruction, including transferring by the I/O subsystem to a storage area available to a requesting OS of requested I/O data associated only with the requesting OS, and filtering out non-meaningful data of the requested type associated with other OSs in the CEC.

2. A method of controlling system hardware operations as defined in claim 1, comprising the steps of performing a start interpretive execution (SIE) instruction by a hypervisor accessing a state description (SD) operand of the SIE instruction to initiate execution of an OS in the CEC, executing by the OS of a synchronous channel subsystem call (CHSC) instruction in the CEC for requesting I/O data from the I/O subsystem in the CEC regarding shared I/O resources, and accessing the CCAM by an address located through the SD to determine if the CHSC instruction can be executed by the CPU in pass-thru mode without any intervention by the hypervisor.

3. A method of controlling system hardware operations as defined in claim 2, comprising the steps of locating by the CPU of a command request block (CRQB) through an operand in the CHSC instruction, and obtaining an IID of a requesting OS through an SD of a requesting OS, and associating the IID with the CRQB, and sending by the CPU of the CRQB with an associated IID to the I/O subsystem to access requested I/O data.

4. A method of controlling system hardware operations as defined in claim 3, comprising the steps of responding to the executing CHSC instruction by the I/O subsystem providing I/O data in the CRQB associated with the IID of a requesting OS.

5. A method of controlling system hardware operations as defined in claim 4, comprising the steps of accessing information in the I/O subsystem requested by the CRQB, and filtering out by the I/O subsystem of I/O data associated with any other IID other than the IID of the OS associated with the CRQB for providing only filtered information to the OS.

6. A method of controlling system hardware operations as defined in claim 5, comprising the steps of locating by the I/O subsystem of resource control block(s) relating to data requested by the CRQB, filtering the data of resource control block(s) associated with the IID assigned to the OS associated with the CRQB, and storing in the CRQB of filtered data obtained by the filtering step, and transferring the CRQB to an area accessible to the OS for completion of the CHSC instruction.

7. A method of controlling system hardware operations as defined in claim 6, comprising the steps of testing a respective bit position in a field in the CCAM before continuing execution of the CHSC instruction to determine if the bit position has a pass-through state, and continuing execution of the CHSC instruction for a pass-through operation by the CPU if the bit position tested by the testing step indicates a pass-through mode for the CHSC instruction.

8. A method of controlling system hardware operations as defined in claim 7, comprising the steps of prohibiting a pass-through execution for the CHSC instruction if the bit position tested by the testing step does not indicate a pass-through mode, and invoking hypervisor intervention for the execution of the CHSC instruction for the OS.

9. A method of controlling system hardware operations as defined in claim 7, comprising the steps of compacting the amount of data in the CRPB provided to the OS by the elimination of I/O subsystem data in the CRQB related only to IIDs other than the IID associated with the CHSC instruction.

10. A method of controlling system hardware operations as defined in claim 2, comprising the step of having each OS in a different partition of the CEC with different IIDs assigned to the respective OSs.

11. A method of controlling system hardware operations as defined in claim 10, further comprising the step of storing a plurality of CHSC control masks (CCAMs) respectively addressed through SDs of different OSs to enable each CCAM to control pass-thru mode for a unique set of CHSC instructions, the different sets of instructions being able to differ in whether a CPU can provide pass-through operations for an executing instruction.

12. A method of controlling system hardware operations as defined in claim 11, further comprising the steps of leaving no IID value in an IID field in the CRQB of an instruction being issued by an OS, associating by a CPU of the IID value of an OS issuing the instruction with a CRQB provided to the I/O subsystem for continuing execution of the instruction to enable the I/O subsystem to use the IID when obtaining data requested by the CRQB, and responding by the I/O subsystem to the OS with a command response block (CRPB) having data associated with the IID of a requesting OS.

13. A method of controlling system hardware operations as defined in claim 12, further comprising the step of indicating an error condition if an IID is found in the CRQB or CRPB when accessible to the OS.

14. A method of controlling system hardware operations as defined in claim 13, further comprising the step of providing a predetermined value in the IID field of the CRQB or CRPB when the CRQB is accessible to the I/O subsystem and not accessible by an OS.

15. A method of controlling system hardware operations as defined in claim 14, further comprising the step of providing a zero value in an IID field of the CRQB and CRPB when accessible by an OS.

16. A method of controlling system hardware operations as defined in claim 12, the associating step further comprising the step of accessing by a CPU of the CEC of an IID for a requesting OS in a state description (SD), the SD having previously been provided by a hypervisor of the CEC as an operand of a start interpretive execution (SIE) instruction.

17. A method of controlling system hardware operations as defined in claim 12, the associating step further comprising the step of copying by the CPU of the CRQB into an I/O subsystem storage accessible to the I/O subsystem but not accessible to the OS, and copying by CPU of the IID of the OS issuing the instruction into the CRQB accessible to the I/O subsystem to control selective use of the IID of the OS by the I/O subsystem.

18. A method of controlling system hardware operations as defined in claim 1, further comprising the steps of:

storing in I/O subsystem storage of data containing IIDs of OS's associated with the data;

selecting by the I/O subsystem of the data having the IID of a requesting OS, while filtering out data having an IID of a different OS; and building a response block (CRPB) by the I/O subsystem writing items of data obtained by the selecting step in and to the CRQB.

19. A method of controlling system hardware operations as defined in claim 18, further comprising the steps of:

copying by the CPU of the CRPB built by the building step into an OS storage accessible to the OS, without copying any IID into the OS storage to prevent access by the OS to any IID, to eliminate a need for IIDs by the OSs and to maintain IID transparency to the OSs.

20. A method of controlling system hardware operations as defined in claim 1, comprising the steps of starting interpretive execution by a control program in a computer electronic complex (CEC) by accessing a state description control block (SD) defining a virtual CPU in the CEC;

interpretively executing by a program in the CEC issuing a synchronous channel subsystem call (CHSC) instruction for requesting I/O information regarding a shared I/O resource of an I/O subsystem of the CEC;

assigning identifiers (IIDs) to different OS's in respective partitions in the CEC, the filtering step executed by the I/O subsystem selecting requested data and operations associated only with the IID of a requesting OS.

* * * * *